May 16, 1933.  H. A. LOCKWOOD  1,909,873
BAKE PAN
Filed Oct. 27, 1930
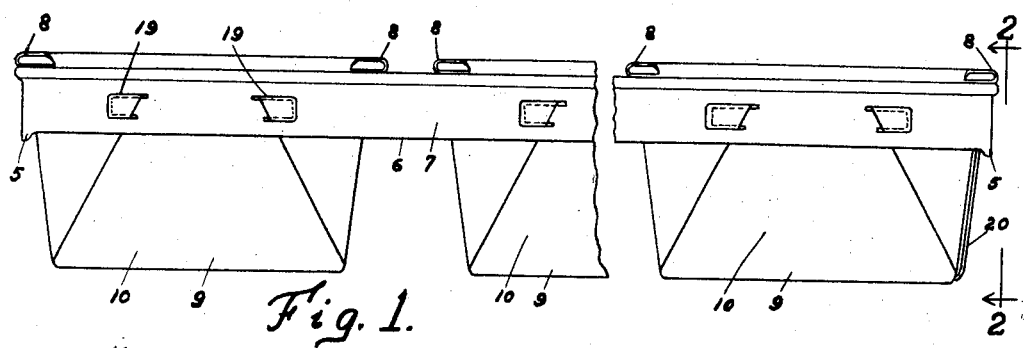
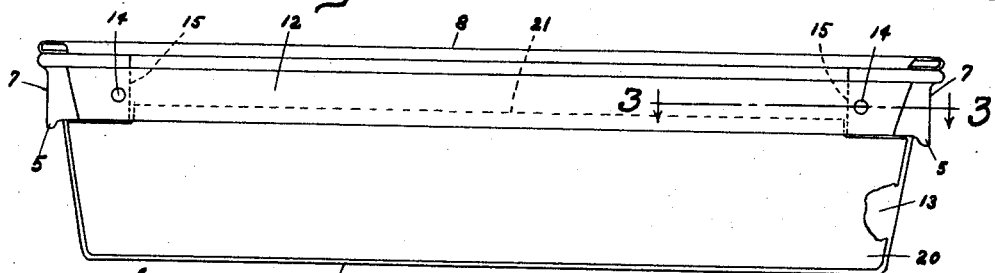
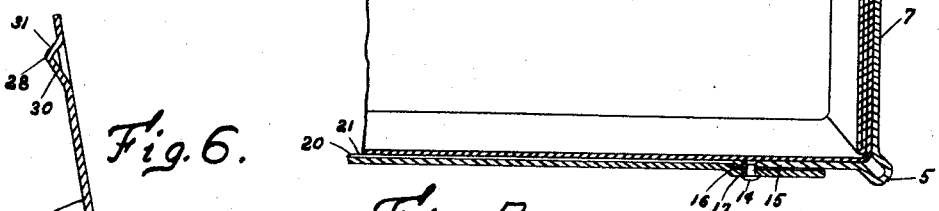
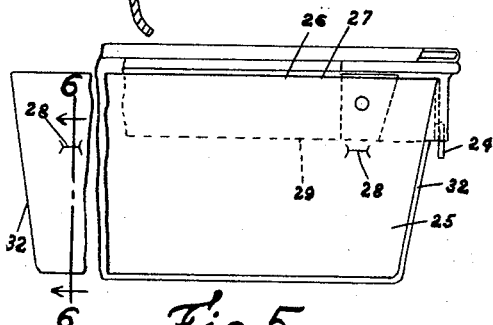
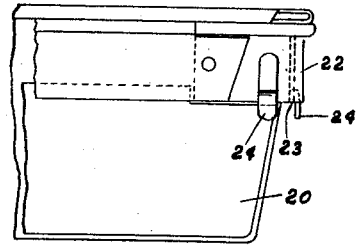
Inventor
Harry A. Lockwood
By Murray and Rugelter
Attorneys Patented May 16, 1933

1,909,873

UNITED STATES PATENT OFFICE

HARRY A. LOCKWOOD, OF CINCINNATI, OHIO, ASSIGNOR TO THE LOCKWOOD MANUFACTURING COMPANY, OF CINCINNATI, OHIO, A CORPORATION OF OHIO

BAKE PAN

Application filed October 27, 1930. Serial No. 491,385.

This invention relates to improvements in bake pans.

An object of the invention is to provide a unitary bake pan structure with means whereby the pans, when nested, will be precluded from chafing and wearing off the tin plate from the dough contacting inner surfaces of a subjacent set of pans.

Another object of the invention is to provide means for the above purpose, which are simple and inexpensive of manufacture.

These and other objects are attained by the means described herein and disclosed in the accompanying drawing, in which:

Fig. 1 is a side elevational view of a unitary bake pan structure embodying the invention.

Fig. 2 is an end elevational view taken on line 2—2 of Fig. 1.

Fig. 3 is an enlarged cross-sectional view taken on line 3—3 of Fig. 2.

Fig. 4 is a view similar to Fig. 2, part being broken away, showing a modified form of the invention.

Fig. 5 is a view similar to Fig. 4 showing a modified form of the invention wherein a bumper or protection plate is constructed so as to provide proper protection for the pan interiors.

Fig. 6 is a cross sectional view, taken on line 6—6 of Fig. 5, of the bumper or protection plate.

Although various means have been proposed for precluding shifting of bake pans when nested, such means have been objectionable for various reasons. In the majority of cases, the means precluding shifting serve to function for limiting shifting movement only in two directions, there being no way to prevent chafing of the pans when relatively shifted in other directions. Other means for the purpose herein stated, have been objectionable because of the cost incident to their attachment to the pan units. In one embodiment of the instant invention, the means precluding shifting of the pans in all directions, are formed by merely drawing out the metal of the unit band or strap, which is a comparatively simple operation, whereby to provide the downwardly extending stops or lugs 5 which are intended to extend into the four outer corners of a subjacent similar unitary pan structure. It should be readily apparent that the stops 5, one of which is located at each corner of the pan structure, will preclude shifting of the pans, when nested, in any direction. The stops are so located relative to the pan corners and the lower edge 6 of the encircling band 7 that the stops will snugly engage the four outer corners of the pan unit at such time as the lower edge 6 of band 7 is in contacting relation with the upper edges 8 of a subjacent unit.

In the drawing, a series of pans is indicated at 9, and said pans are connected in spaced parallelism by means of the side straps 7, to which the opposite end walls 10 of the pans are attached, and the end straps 12 which connect the opposite ends of the side straps. The end straps lie adjacent the outer sides 13 of the endmost pans. Although the end straps 12 are herein disclosed as separate elements, whereby the side straps may be connected by means of the rivets 14, it is to be understood that the encircling band thereby formed may be of a single length of shaped strap metal. When the continuous band construction is not used, each side rail 7 has each of its opposite ends 15 turned inwardly along the outer side walls of the endmost pans. Such ends may be provided with perforations 16 each to be aligned with a cooperative perforation 17 in the end strap 12, for reception of a rivet or the like 14, as indicated in Fig. 3. The depending stops or lugs 5 are formed at the corners where the opposite ends of the side straps are turned inwardly. These corners, although they may vary as to shape, preferably are V or U-shaped in cross section, as indicated in Fig. 3, so as to extend out sufficiently to provide for proper spacing of the pan walls of the upper set, from the pan walls of the lower set. Such V or U-shaped construction also provides sufficient metal so that the stops 5 may readily be drawn from the metal of the corners, without materially weakening the corners of the pan unit.

From the foregoing it should readily be apparent that by means of the simple and inexpensive construction above set forth, the pan bottoms and all sides of each pan of a given unit will be positively held in spaced relationship with corresponding parts of the pans of a unit with which it is nested. It is to be understood that the stops 5, instead of being integral with the pan rails may be formed independently of the rails and attached thereto in any suitable manner.

In the modification shown in Fig. 4, the corners 22 of the encircling band are extended outwardly as indicated at 5 in Fig. 3. The corners 22, however, have no depending lug or stop, for the reason that the lower edge 23 of the corner extension is, in this modification, adapted to rest upon the upper edge of a lower set of pans. On each side of the corner extension 22, part of the encircling band is punched outwardly and bent downwardly as at 24, to provide depending lugs, one of which abuts the inner surface of the pan end wall, and the other, the inner surface of the pan side wall. The extending corner 22 and lugs 24 are formed at the four corners of a pan unit, wherefore they serve to preclude shifting of the pans in all directions. The lugs 24 do not contact the corners of the pans, as do the depending lugs 5 of Fig. 2. The usual bumper or protecting plate 20 may be mounted adjacent the pan side 13, if desired, with its upper edge 21 slidably received between the end strap 12 and the pan side 13.

In the modification shown in Figs. 5 and 6, a bumper or protecting plate 25 is riveted or otherwise suitably secured to the outer surface 26 of the end strap 27, and said bumper has pressed outwardly therefrom two or more stops or abutments 28, which are disposed slightly below the lower edge 29 of the encircling band. The lowermost slope 30 of the depression preferably is made longer than the uppermost slope 31, so as to provide for ready nesting of the pans. The extensions 28 are located near the side edges 32 of the bumper plate, and they extend outwardly to such an extent that they will contact the inner surfaces of the outermost pan walls at substantially the same time that the lower circumferential edge 29 of the encircling band rests upon the upper pan edges of a subjacent nested unit. It will be readily understood that the extensions 28 will preclude only relative longitudinal movement of the nested pans, and that any suitable means, such as the depending lugs 24 of Fig. 4, may be employed for limiting sidewise movement of the pan units. It is to be understood that no parts of the bumper plate 25 other than the extensions 28, will contact the interior plated surface of a pan of a subjacent unit. Although the shape of the extension is, in a broad sense, immaterial to the invention, the extensions should not be so large as to contact an appreciable area of the plated interior of a subjacent pan, and the contact should be made as close as possible to the upper edge of said plated surface.

It will be readily understood that the type of pan constituting the pan unit is immaterial to the invention. A unit comprising seamless drawn pans would require an attaching means, different from that indicated at 19, for attaching the pan ends to the side rails 7.

What is claimed is:

1. In a unitary bake pan structure comprising a plurality of pans disposed in spaced relation, the combination therewith of means determining the extent to which the structure may be nested within another unit, stops depending downwardly at certain corners of the structure and adapted to enter certain outermost corners of the endmost pans of a similar structure to be nested thereinto, whereby to preclude relative shifting of the nested unitary structures in all lateral directions without subjecting the corners of the subjacent pan unit to the spreading and crushing effect of the weight of the upper unit.

2. In a unitary bake pan structure comprising a plurality of pans disposed in spaced relation, the combination therewith of means determining the extent to which the structure may be nested within another unit, stops depending downwardly at the four corners of the structure and adapted to enter the outermost corners of the endmost pans of a similar structure to be nested thereinto, whereby to preclude relative shifting of the nested unitary structures in all lateral directions without subjecting the corners of the subjacent pan unit to the spreading and crushing effect of the weight of the upper unit.

3. In a unitary bake pan structure comprising a plurality of pans nestable to a predetermined depth and disposed in spaced relation, the combination therewith of metal stops depending downwardly at the four corners of the structure and adapted to enter the outermost corners of the endmost pans of a similar structure to be nested thereinto, whereby to preclude relative shifting of the nested unitary structures in all lateral directions, said stops being of such proper dimensions and location to abut said wall for spacing the units without influencing the depth of pan nesting.

4. In a unitary bake pan structure the combination of a plurality of spaced parallel bake pans, side rails connected with corresponding ends of adjacent pans and arranged to support substantially the entire weight of a pan structure when nested with a subjacent pan structure, the side rails having inwardly turned ends, the corner formed thereby being outwardly extending and of substantial U-shape, and a drawn metal stop depending from the U-shaped corner for reception in the outermost corners of a subjacent similar unitary bake pan structure in which enter the pans of the first unit.

5. In a unitary bake pan structure the combination of a plurality of spaced parallel bake pans, side rails connected with corresponding ends of adjacent pans, the side rails having inwardly turned ends the corner formed thereby being outwardly extending and of substantial U-shape, a drawn metal stop depending from the U-shaped corner for reception in the outermost corners of a subjacent similar unitary bake pan structure, the relationship between the side rails and depending stops being such that the rails serve to preclude deep nesting at such time as the stops preclude shifting in all lateral directions.

6. In a unitary bake pan structure the combination of a plurality of spaced parallel bake pans, a pan supporting member connecting the pans and having corners embracing the outermost corners of the endmost pans, each of said corners of the pan supporting connecting member having depending therefrom a stop spaced from and located outwardly of the said outermost pan corners and adapted to engage the outermost corners of corresponding endmost pans of a subjacent pan unit when nested thereinto.

7. In a unitary bake pan structure the combination of a plurality of spaced parallel bake pans, a pan supporting member connecting the pans and arranged to carry the weight of the pans, said member having corners embracing the outermost corners of the endmost pans, and means depending from the connecting member on each side of each corner of the connecting member, said depending means being adapted to extend into the endmost pans of a subjacent similar nested unit and to contact said pans adjacent their outermost corners near the upper edges thereof for precluding shifting of the pan units in all directions in the plane of the units.

8. In a unitary bake pan structure the combination of a plurality of bake pans secured together in a common plane, the resultant unitary structure having endmost pans, means for determining the extent to which the pan structure may nest with a subjacent similar pan structure and a protective bumper plate disposed adjacent each endmost pan, each plate having extensions thereon adapted to abut a wall of an endmost pan of a subjacent similar nested unit, near the upper edge of said endmost pan of the subjacent unit, said extension being of such proper dimensions and location to abut said wall for spacing the units without influencing the depth of pan nesting.

In testimony whereof, I have hereunto subscribed my name this 11th day of October, 1930.

HARRY A. LOCKWOOD.